Nov. 17, 1925. 1,561,585
A. M. BATES
PACKER
Filed May 26, 1922 3 Sheets-Sheet 2
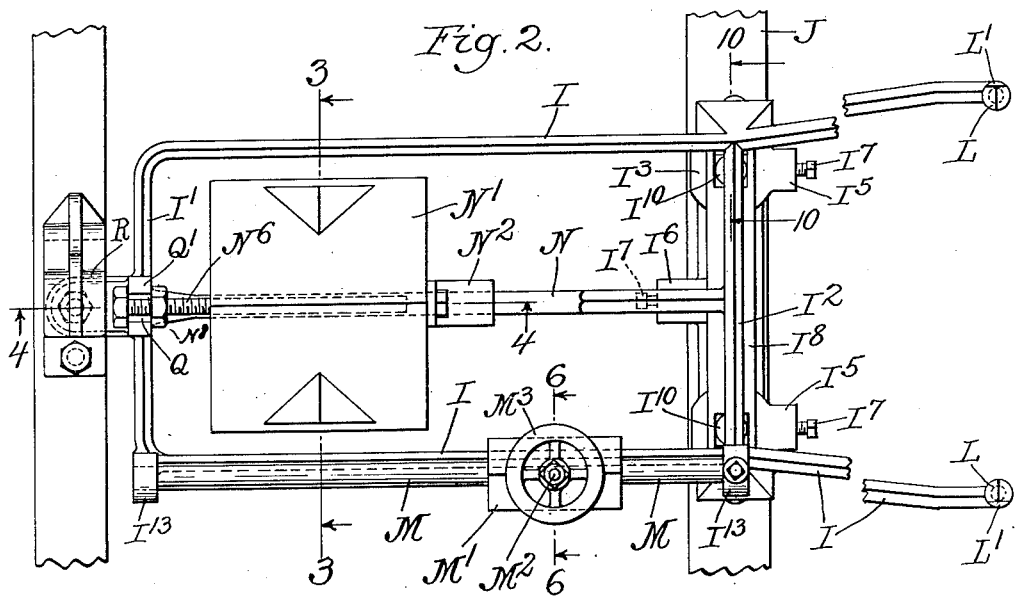
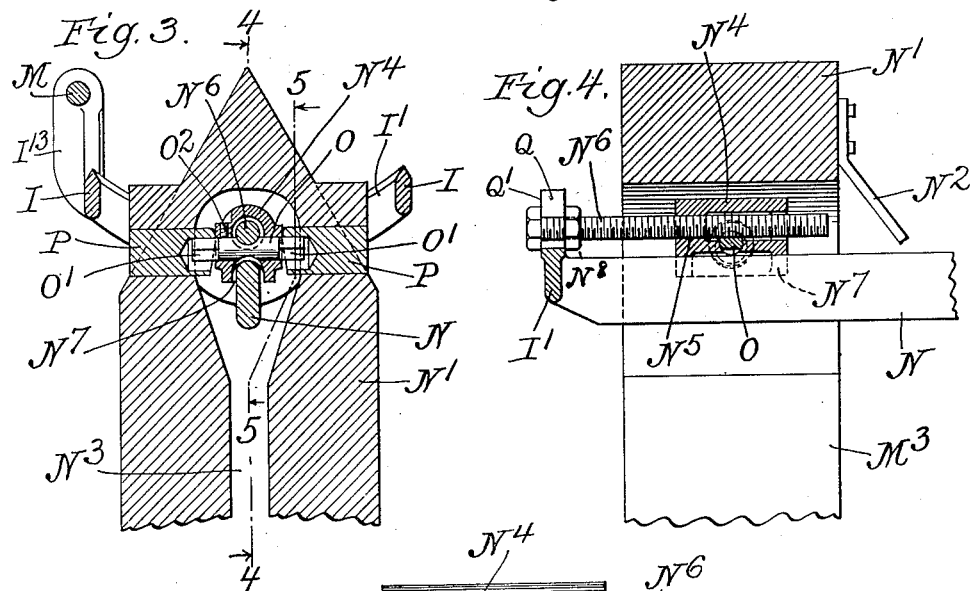
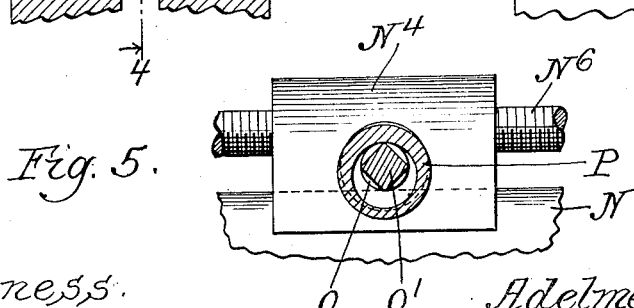
Witness.
Edward T. Wray.
Inventor.
Adelmer M. Bates.
by Parker & Carter
Attorneys.

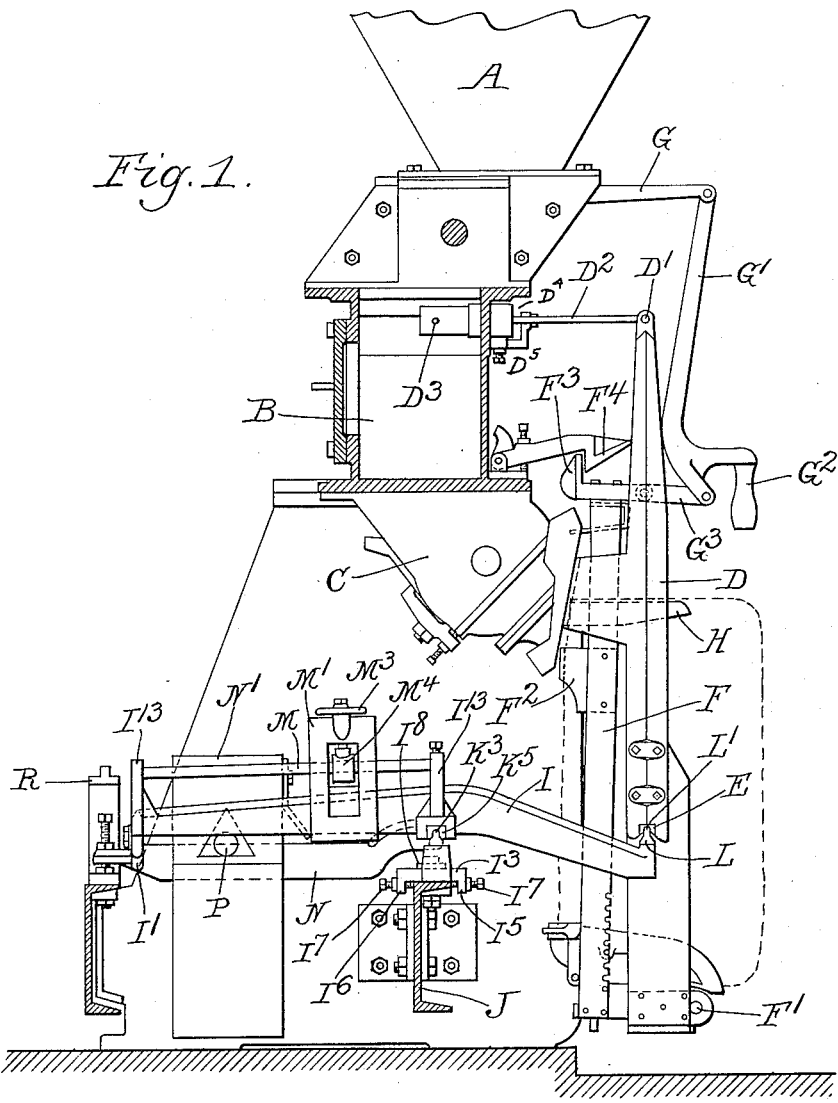

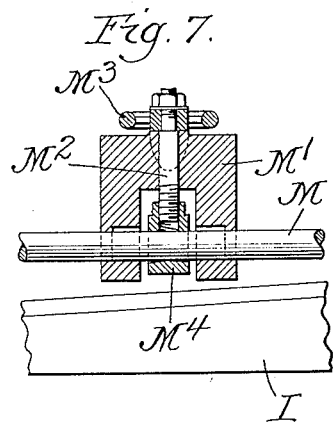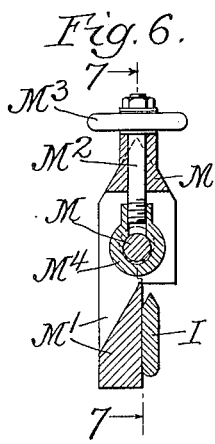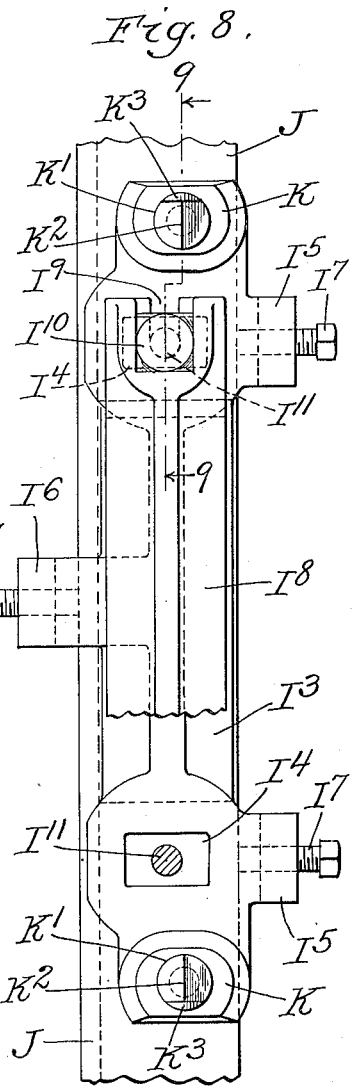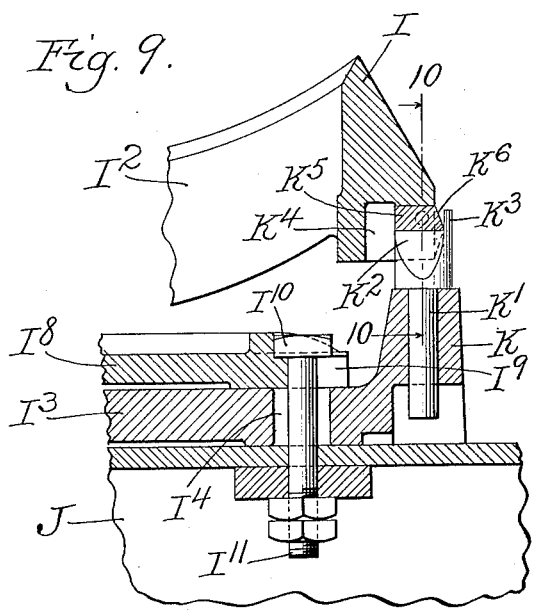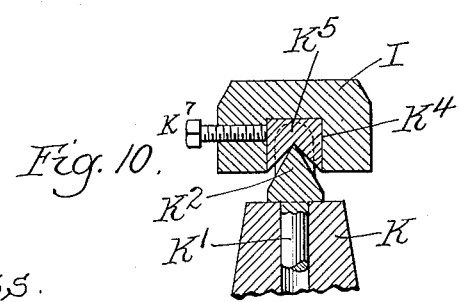

Patented Nov. 17, 1925.

1,561,585

UNITED STATES PATENT OFFICE.

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

PACKER.

Application filed May 26, 1922. Serial No. 563,932.

*To all whom it may concern:*

Be it known that I, ADELMER M. BATES, a citizen of the United States, residing at Chicago, in the county of Cook and State of Illinois, have invented a certain new and useful Improvement in Packers, of which the following is a specification.

This invention relates to a bag or package filling machine wherein the package is weighed as it is filled and wherein preferably the filling is automatically terminated when a given amount of material has been put into the package. The application deals particularly with the weighing mechanism.

It is illustrated more or less diagrammatically in the accompanying drawings, wherein:

Figure 1 is a side elevation of a weighing machine, with parts in section, showing the weighing mechanism in elevation. Fig. 2 is a plan view of the weighing mechanism. Fig. 3 is a vertical cross section on line 3—3 of Fig. 2. Fig. 4 is a vertical cross section on line 4—4 of Figs. 2 and 3. Fig. 5 is a vertical cross section on an enlarged scale taken on line 5—5 of Fig. 3, weight not shown. Fig. 6 is a vertical cross section taken on line 6—6 of Fig. 2. Fig. 7 is a vertical cross section taken on line 7—7 of Fig. 6. Fig. 8 is a plan view on an enlarged scale, with parts omitted, of the balance point of the scale mechanism. Fig. 9 is a vertical cross section on line 9—9 of Fig. 8 showing a fragment of the scale beam in position upon the balance point. Fig. 10 is a vertical cross section taken on the line 10—10 of Figs. 2 and 9. Like parts are designated by like characters throughout.

I provide a hopper A into which material is introduced and from which it is discharged downwardly through the chest B into the discharge chamber C. An impeller, not shown, is positioned within the chamber C and rotated to feed the material from the chamber into the bag.

A bag support D is held in position at its upper end by a pivot D' on a laterally extending rod $D^2$, The other end of rod $D^2$ is pivoted at $D^3$ to a housing $D^4$ extending into the chest B. The housing $D^4$ is held in adjusted position by a set screw $D^5$. The support D has a pivotal support E on each side near its lower end. These pivotal supports connect the support D with bars of a scale beam, described below, and are constructed like the pivotal supports of the beam, also described below. Within the frame D is pivotally mounted a bag supporting cradle F, which is pivoted at F' upon the frame D adjacent its bottom and is provided wih a bag steadying apron $F^2$ and, adjacent its top, with a hook $F^3$ adapted to engage a hook $F^4$ pivotally mounted on the casing of the chest B.

An arm G extends from a fixed portion of the machine. A link G' is pivoted at its upper end to arm G and carries a handle $G^2$ at its lower end. A link $G^3$ connects handle $G^2$ and supporting cradle F.

A spout H is carried by the support D in position to co-operate with the feed opening in chamber C and to enter the valve of a valve bag in cradle F.

The scale beam comprises side bars I, I joined at their rear end by a cross member I' and at their balance points by a cross member $I^2$. A beam J, constituting part of the frame of the machine, is positioned beneath the balance points of the scale beam. Upon this member J there is adjustably positioned a supporting plate $I^3$, which is provided with a pair of openings $I^4$ and has on one side two lugs $I^5$ $I^5$ and on the other a lug $I^6$. In each of these lugs there is positioned a set screw $I^7$, which is adapted to bear against a side of the member J, and these screws may be manipulated to adjust the position of the plate $I^3$. Mounted upon the plate $I^3$ is a holding plate $I^8$ provided in each end with a notch $I^9$. These notches are adapted to hold heads $I^{10}$ of holding bolts $I^{11}$ by means of which the pivot point assembly of the scale is held in position.

At each end of the plate $I^3$ a lug K is perforated to receive a vertical pivot K' of a block having an upwardly directed knife edge $K^2$ and an extension $K^3$ at the outer end of the knife edge. Each bar I has a recess $K^4$ in which there is adjustably mounted a wearing plate or block $K^5$. Each block $K^5$ is adapted to rest upon a knife edge $K^2$ and has a cone-shaped end $K^6$ adapted to contact an extension $K^3$, so as to hold the scale beam against lateral movement without undue friction. Block K⁵ may be held in adjusted position by set screw K⁷.

Each bar I is provided at its outer end with a lug similar to lug K, and carries a block L having a knife edge and an extension L' similar to knife edge K² and extension K³, and the support D is provided at E with wearing plates or blocks similar to blocks K⁵.

Extending laterally above one of the scale beams I and lying in the same general vertical plane with it and supported by brackets I³, integral with the side bar I, is an adjusting weight carrying bar M upon which is mounted an adjusting weight M'. Within the weight M' is a vertical shaft M², which is controlled by a thumb wheel M³ by means of which it may be rotated. In the lower end of the shaft M² and about the shaft M is a locking ring M⁴. By means of the rotation of the wheel M³ the ring may be drawn up so as to grip the shaft M and hold the weight in position upon it. The reverse movement of the wheel will free the ring from engagement with the shaft M so that the adjusting weight may be moved laterally along the shaft in order to adjust the scale.

A straight member N runs from cross member I' to cross member I² between and substantially parallel to the rear ends of bars I, I. A main weight N' is mounted upon the member N. The weight N' is provided at its front end with a skirt N² projecting for a distance over the member N and shielding it from dirt. In this connection it will be noted that all of the upper surfaces of the parts of the scale are ridged or peaked in order to minimize the deposition of material upon them. The center of the weight N' is provided as shown with the slot N³, and within this slot adjacent its upper end there is mounted a tubular slide member N⁴. This member is screw threaded on its interior, as at N⁵, and this screw threaded portion is in mesh with an adjusting bolt N⁶. By means of the rotation of this bolt the weight N' may be moved longitudinally of the member N. The member N⁴ is provided on its under side with a groove N⁷ within which the upper edge of member N fits loosely.

The tubular member N⁴ is perforated adjacent its center and there is inserted in this perforation a plug O, which is provided at each end with a squared portion O' adapted to furnish a knife edge for the balance of the weight. This plug may be rotated to bring a different knife edge into operation when one has been worn, and it is held in position by means of a set screw O².

Inserted in the sides of the weight N' are a pair of balancing plugs P P, which are provided with cylindrical perforations in their inner ends which fit over the ends O' O' of the plug O. By means of this construction there is provided a knife-edge balancing point whereby the weight N' is suspended from member N⁴ which slides upon member N.

The adjusting screw N⁶ is held at one end in a notch Q of a lug Q', which is preferably made integral with cross member I'. A lock nut N⁸ on screw N⁶ may be tightened against lug Q' to hold the screw and weight in adjusted position. When nut N⁸ is loosened, the screw may be lifted out of the notch and the weight removed from the beam.

R is a scale beam stop, normally out of contact with the scale beam, but adapted to limit its upward movement and thus to limit the downward movement of the bag end of the scale.

The use and operation of my invention are as follows:

The scale mechanism is intended primarily to be used in connection with a bag filling machine wherein bags or other packages are to be filled to a predetermined weight of material and wherein the bag is supported in a cradle which is carried upon a scale beam. As material is introduced into the package the beam is depressed by the weight of the material. The flow of material into the package is gradually automatically cut off until it finally stops when a sufficient weight of material has been inserted to depress the scale beam to the limit of its downward excursion. The amount of material fed into the package is thus controlled by the weight on the scale beam and the main weight N' is provided to control approximately this predetermined weight of material. The secondary adjusting weight is adapted to be moved laterally to make the necessary adjustment to bring the scale into accurate adjustment and to keep it so. The handle G², for controlling the package or dumping it from the cradle when its filling has been completed is pivotally supported from above, and thus the weight of the operator's hand does not come upon the scale beam, and possible interference in weight, due to this cause, is prevented.

The weighing and bag-supporting mechanism must be adjusted to the feeding mechanism when the apparatus is originally assembled, after repairs are made and whenever the mechanism is out of adjustment for any reason. In order that the receiving end of spout H may move in proper relation to the discharge orifice of chamber C, it is necessary that the axes of the pivots be parallel with the plane of contact between the spout and the feeder, that the upper and lower ends of frame D be positioned so that the plane at the receiving end of spout H has the proper vertical angle, and so that the spout is the correct distance from the feeder, and the spout must be in lateral alignment with the discharge orifice.

Set screws I⁷ are used to bring the knife edges into proper alignment horizontally and also to position knife edges L the proper distance forward from beam J.

As will be seen from Fig. 1, the length of rod D² is the same as the distance between knife edges K² and L, so that the rod and scale beam act as parallel links and maintain frame D at the same angle during its downward movement. Any tilting of frame D during its movement would vary the effective distance of the load from the fulcrum of the beam, and so would affect the weighing. Pivot D' is properly positioned by adjustment of housing D⁴ without affecting the length of rod D² or its parallelism with the scale beam.

Upward extensions K³ are a fixed distance apart, and wearing blocks K⁵ are adjusted so that their surfaces K⁶ fit exactly as desired between extensions K³, and wearing blocks E are adjusted in like manner between extension L'.

Lateral adjustment of spout H may be effected by adjustment of the wearing blocks without disturbing plate I³, or plate I³ may be adjusted as allowed by slots I⁴ without disturbing the wearing plates.

Although I have shown but one form of the device, it will be obvious that many changes in size, shape and relation of parts may be made without departing materially from the spirit of my invention.

Claims:

1. In a scale mechanism, a main frame, a supporting member mounted upon said frame, and a scale beam pivotally mounted upon said member, said member forming the sole support of said beam and being horizontally adjustable, with relation to said main frame, both axially and radially of said pivotal mounting.

2. In a scale mechanism, a main supporting frame, a scale beam pivoted thereon, and a supporting member at such pivot point mounted upon the main frame and adapted to support the scale beam, said supporting member being laterally and longitudinally adjustable with relation to said main frame, said adjustment being accomplished in part by means of a plurality of set screws, two of the set screws bearing upon one side of said frame and another bearing upon the opposite side intermediate of such two.

3. In a scale mechanism, a main supporting frame, a scale beam pivoted thereon, and a supporting member at such pivot point mounted upon the main frame and adapted to support the scale beam, said supporting member comprising two main parts, the one laterally and longitudinally adjustable with relation to said frame, and the other longitudinally adjustable and adapted to secure said first member to said frame.

4. In a scale mechanism, a main supporting frame, a scale beam pivoted thereon, and a supporting member at such pivot point mounted upon the main frame and adapted to support the scale beam, said supporting member comprising one part laterally and longitudinally adjustable with respect to said frame, said adjustment being accomplished by means of a plurality of set screws of which two are adapted to bear upon one side of said frame and another adapted to bear upon an opposite side of said frame intermediate said two, and an attaching part adapted to attach said first part to said frame.

5. In a scale mechanism, a main supporting frame, a scale beam pivoted thereon, and a supporting member at such pivot point mounted upon the main frame and adapted to support the scale beam, said supporting member comprising one part laterally and longitudinally adjustable with respect to said frame, said adjustment being accomplished by means of a plurality of set screws of which two are adapted to bear upon one side of said frame and another adapted to bear upon an opposite side of said frame intermediate said two and an attaching part adapted to attach said first part of said frame, said attaching part being longitudinally adjustable with relation to said frame.

6. In a scale mechanism a main supporting frame and a scale beam pivoted thereon, a supporting member at such pivot point mounted upon the main frame and adapted to support the scale beam, said supporting member being formed in two parts, one of them provided with a pair of openings and longitudinally and laterally adjustable with relation to said frame, and the other provided with a pair of openings adapted to register with the openings of such first part and being longitudinally adjustable with relation to said frame, and attaching means adapted to extend through such openings and to be adjustable therein.

7. In a scale mechanism a main supporting frame and a scale beam pivoted thereon, a supporting member at such pivot point mounted upon the main frame and adapted to support the scale beam, said supporting member being formed in two parts, one of them provided with a pair of openings and longitudinally and laterally adjustable with relation to said frame, and the other provided with a pair of openings adapted to register with the openings of such first part and being longitudinally adjustable with relation to said frame, and attaching means adapted to extend through such openings and to be adjustable laterally and longitudinally within the openings of said first part and laterally adjustable with relation to the openings of said second part.

8. In a scale, a fixed horizontal beam, a supporting plate resting on the upper side of the fixed beam and adjustable laterally and longitudinally thereon, a knife edge at each end of the plate and a scale beam supported on the knife edges.

9. A scale beam having adjacent one end a lug with an upwardly open notch therein, a weight with a groove in its lower side to receive the beam, and an adjusting member extending from the weight in a direction parallel with the groove and adapted to rest in the notch.

10. In a scale mechanism, a scale beam provided with a receiving pocket and means for adjustably supporting a weight on one side of the beam, said means including a screw adapted by its rotation to cause movement of the weight longitudinally of the beam, the said screw being mounted at one end within the walls of said pocket, in the scale beam, whereby it and the weight may be readily lifted from the scale without derangement of the general scale assembly.

11. In a scale assembly, a scale beam provided with a receiving pocket, a member adapted to slide on the beam, a weight pivotally supported from said member, and means for moving said member longitudinally of the beam, said means including a screw held at one end in the pocket in the beam.

12. In a scale assembly, a scale beam, a member adapted to slide on the beam, said member having mounted therein a crosspiece having ends angular in cross-section, a weight, and bearing cups mounted on the weight and adapted to enclose said angular ends.

13. In a scale assembly, a scale beam, a member adapted to slide on the beam, said member having mounted therein a crosspiece having ends angular in cross-section, a weight, and bearing cups mounted in the weight adapted to enclose said angular ends and having rounded pockets.

14. In a scale assembly, a scale beam, a member adapted to slide on the beam, said member having mounted therein a crosspiece having ends angular in cross-section, a weight, and bearing cups mounted in the weight and adapted to enclose said angular ends, said cross-piece being rotatable to bring different angular portions of its ends into bearing relation with the cups.

15. In a scale mechanism, a weight supporting bar, a weight having spaced perforated lugs through which the bar slides, a member slidable upon the bar between the lugs, and adjustable connections between the member and weight for moving the weight laterally of the bar with respect to the lugs and thereby clamping the weight in position on the bar.

16. In a scale mechanism, a scale beam, and means supporting upon one side of the beam an adjusting weight, said means including a laterally extending bar adapted to be supported upon said scale beam by means of a plurality of integral brackets.

17. In a scale mechanism, a scale beam, means supporting upon one side of the beam an adjusting weight, said means including a laterally extending bar adapted to be supported upon said scale beam by means of a plurality of integral brackets, an adjusting weight mounted on said bar and adapted to move laterally therealong, and means for locking said weight in position, said locking means comprising a tubular member upon said bar and within said weight and means for moving said tubular section so as to cramp the same upon said bar.

18. In a scale mechanism, a scale beam, a bar mounted upon one side of the beam, a weight provided with perforations through which said bar is inserted, said weight being provided with an interior open space and means therein for locking the weight upon the bar, the locking means including a member surrounding the bar and adjustably secured to the weight whereby said member may be moved to grip the bar in combination with the weight.

19. In a scale mechanism, a main frame, an elongated horizontal plate mounted on the main frame and having a pivot support at each end, the plate being so mounted that it may be adjusted longitudinally and laterally and angularly in a horizontal plane, and a two armed scale beam having one arm mounted on each of the pivot supports.

20. In a scale mechanism, a main frame, an elongated horizontal plate mounted on the main frame and having a pivot support at each end, the plate being so mounted that it may be adjusted longitudinally, laterally and angularly in a horizontal plane, a two armed scale beam having one arm mounted on each of the pivot supports, a material support on the ends of the arms, and a feeding device mounted on the main frame in position to feed material to said material support.

21. In a scale mechanism, a main frame, a scale beam pivotally mounted on said frame, a material support pivotally mounted on said beam, a material feeder, a housing adjustable through one wall of the feeder, and a link pivoted to said housing and to said support and substantially parallel with said beam, the pivotal mounting of said beam being adjustable parallel with the adjustment of said housing.

22. In a scale mechanism, a main frame, a scale beam pivotally mounted on the frame, and a material support pivotally mounted on the beam, the pivotal mountings of the beam and support being parallel and each comprising a knife edge and a wearing block adjustable longitudinally of the knife edge.

Signed at Chicago, county of Cook and State of Illinois, this 22nd day of May, 1922.

ADELMER M. BATES.